(12) United States Patent
Muta et al.

(10) Patent No.: US 12,094,127 B2
(45) Date of Patent: Sep. 17, 2024

(54) IMAGE PROCESSING APPARATUS, IMAGE PROCESSING METHOD, AND NON-TRANSITORY COMPUTER-READABLE MEDIUM

(71) Applicant: CANON KABUSHIKI KAISHA, Tokyo (JP)

(72) Inventors: Hajime Muta, Kanagawa (JP); Yasuo Bamba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 344 days.

(21) Appl. No.: 17/542,983

(22) Filed: Dec. 6, 2021

(65) Prior Publication Data
US 2022/0180529 A1 Jun. 9, 2022

(30) Foreign Application Priority Data
Dec. 9, 2020 (JP) ................. 2020-204439

(51) Int. Cl.
*G06T 7/20* (2017.01)
*G06V 10/22* (2022.01)

(52) U.S. Cl.
CPC ............... *G06T 7/20* (2013.01); *G06V 10/22* (2022.01); *G06T 2207/20084* (2013.01)

(58) Field of Classification Search
CPC ............. G06T 7/20; G06T 2207/20084; G06T 2200/24; G06T 2207/20021; G06T 2207/20096; G06T 2207/20104; G06T 2207/20132; G06T 2207/30196; G06T 2207/30232; G06T 2207/30236; G06T 2207/30242; G06T 7/246; G06V 10/22; G06V 20/53
USPC .......................................................... 382/107
See application file for complete search history.

(56) References Cited

U.S. PATENT DOCUMENTS

| | | | |
|---|---|---|---|
| 2016/0350615 A1* | 12/2016 | Yano | G06V 20/53 |
| 2019/0102630 A1 | 4/2019 | Bamba | |
| 2019/0220673 A1 | 7/2019 | Ikeda | |
| 2020/0320312 A1 | 10/2020 | Muta | |

FOREIGN PATENT DOCUMENTS

JP 2009-110152 A 5/2009

* cited by examiner

*Primary Examiner* — Stephen P Coleman
(74) *Attorney, Agent, or Firm* — Canon U.S.A., Inc. IP Division

(57) ABSTRACT

There is provided with an image processing apparatus for measuring a flow of a measurement target based on a video. A detection line indicating a position at which the flow of the measurement target in the video is measured is set. From each of a plurality of images in the video, a plurality of partial images set in a vicinity of the detection line are extracted. The flow of the measurement target passing the detection line is measured using the partial images.

20 Claims, 11 Drawing Sheets

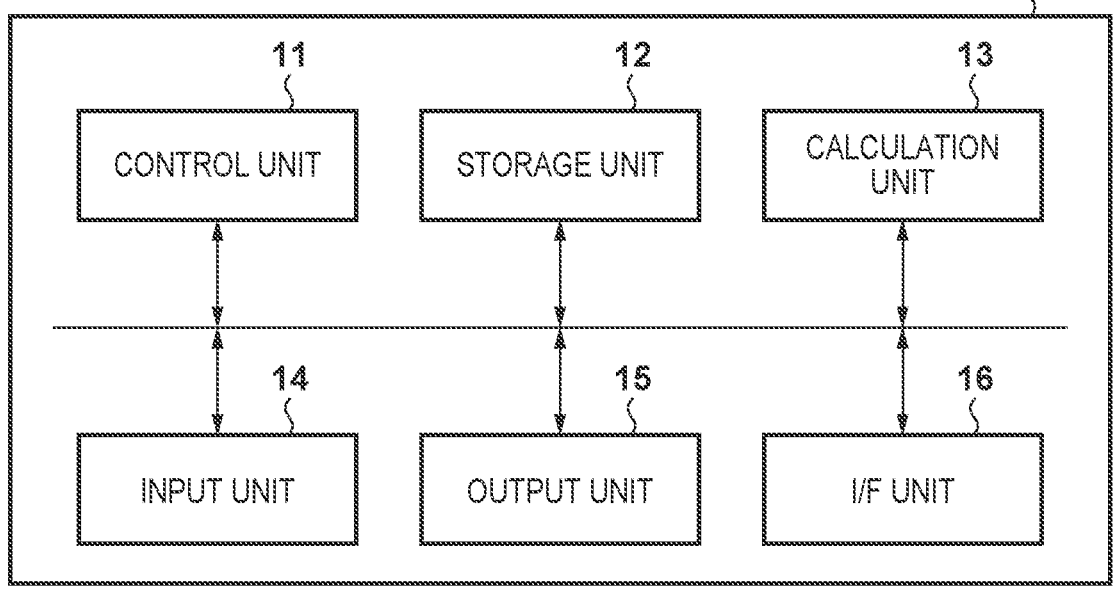
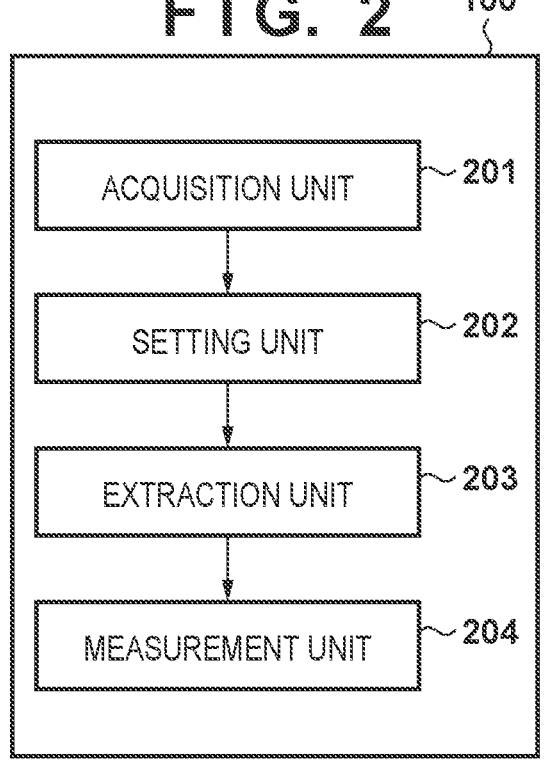
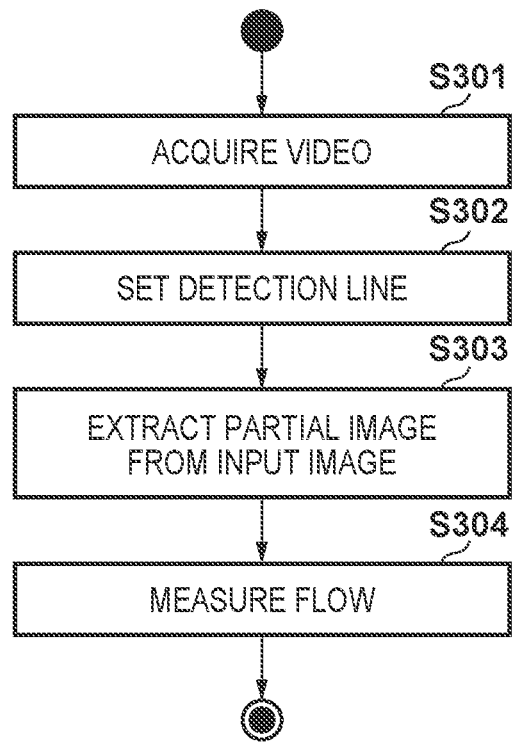

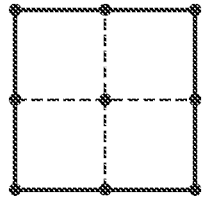
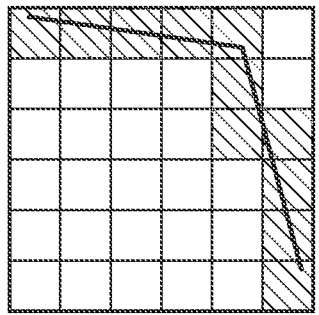
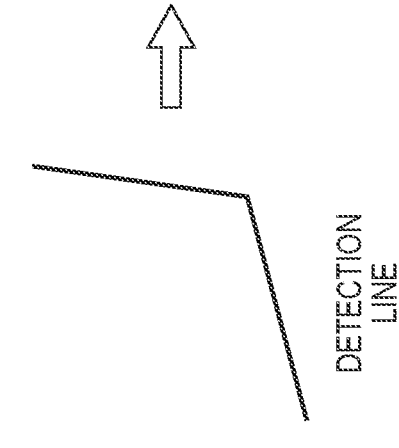
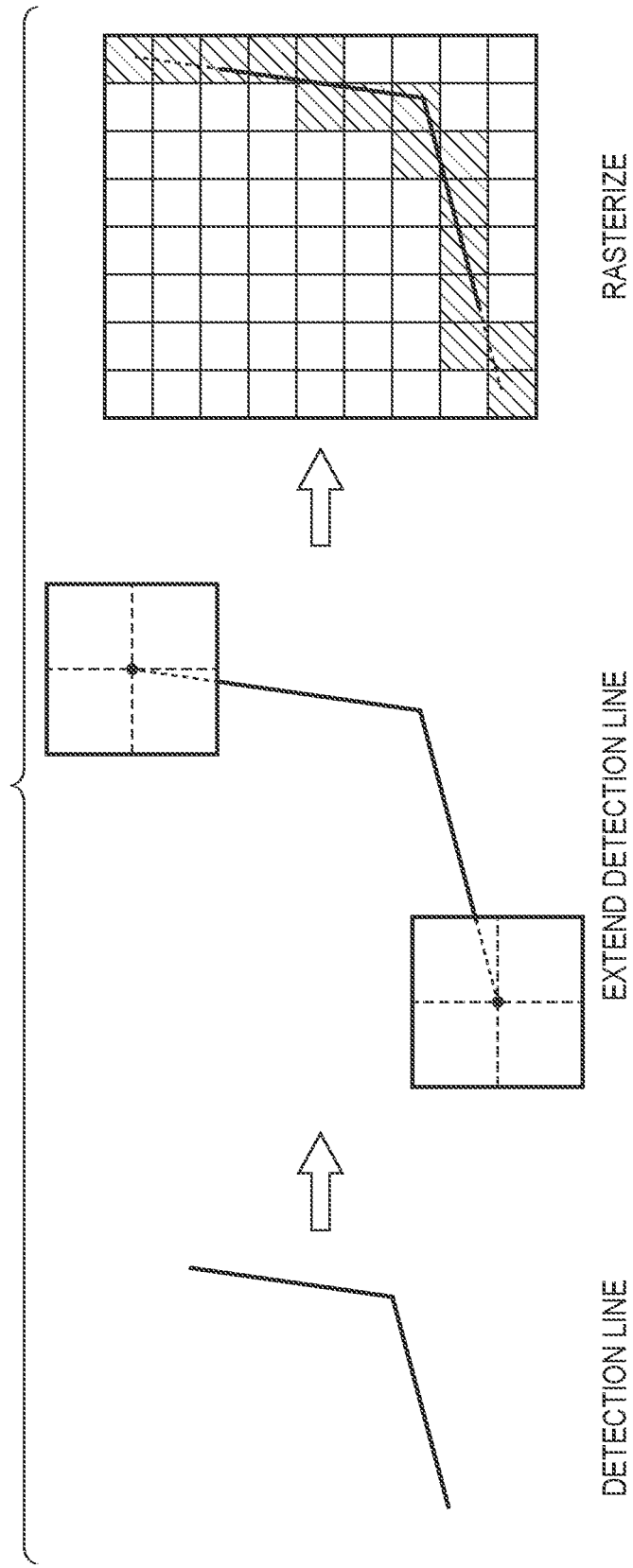

IMAGE PROCESSING APPARATUS, IMAGE PROCESSING METHOD, AND NON-TRANSITORY COMPUTER-READABLE MEDIUM

BACKGROUND

Field

The present disclosure relates to a technique for analyzing videos.

Description of the Related Art

Recently, apparatuses for analyzing a flow of a measurement target, for example, a human flow which is a flow of people, and more specifically, an amount and direction of a flow of people, in an image capturing region of a video captured by a camera or the like has been proposed. Japanese Patent Laid-Open No. 2009-110152 discloses a congestion estimation apparatus that divides an image into a plurality of patches and determines whether a person is moving or staying in each patch.

SUMMARY

According to an embodiment of the present disclosure, an image processing apparatus for measuring a flow of a measurement target based on a video comprises a processor and a memory storing a program which causes the processor to perform: setting a detection line indicating a position at which the flow of the measurement target in the video is measured; extracting, from each of a plurality of images in the video, a plurality of partial images set in a vicinity of the detection line; and measuring the flow of the measurement target passing the detection line using the partial images.

According to another embodiment of the present disclosure, an image processing method of measuring a flow of a measurement target based on a video comprises: setting a detection line indicating a position at which the flow of the measurement target in the video is measured; extracting, from each of a plurality of images in the video, a plurality of partial images set in a vicinity of the detection line; and measuring the flow of the measurement target passing the detection line using the partial images.

According to still another embodiment of the present disclosure, a non-transitory computer-readable medium stores a program which causes a computer to perform: setting a detection line indicating a position at which the flow of the measurement target in the video is measured; extracting, from each of a plurality of images in the video, a plurality of partial images set in a vicinity of the detection line; and measuring the flow of the measurement target passing the detection line using the partial images.

Further features of the present disclosure will become apparent from the following description of example embodiments (with reference to the attached drawings).

BRIEF DESCRIPTION OF THE DRAWINGS

FIG. 1 is a diagram illustrating an example of a hardware configuration of an image processing apparatus.

FIG. 2 is a diagram illustrating an example of a functional configuration of an image processing apparatus.

FIG. 3 is a diagram illustrating an example of a flow of processing of an image processing apparatus.

FIGS. 14A to 14C are diagrams illustrating examples of a method for searching a method for extracting a partial image.

DESCRIPTION OF THE EMBODIMENTS

Figure 4A:
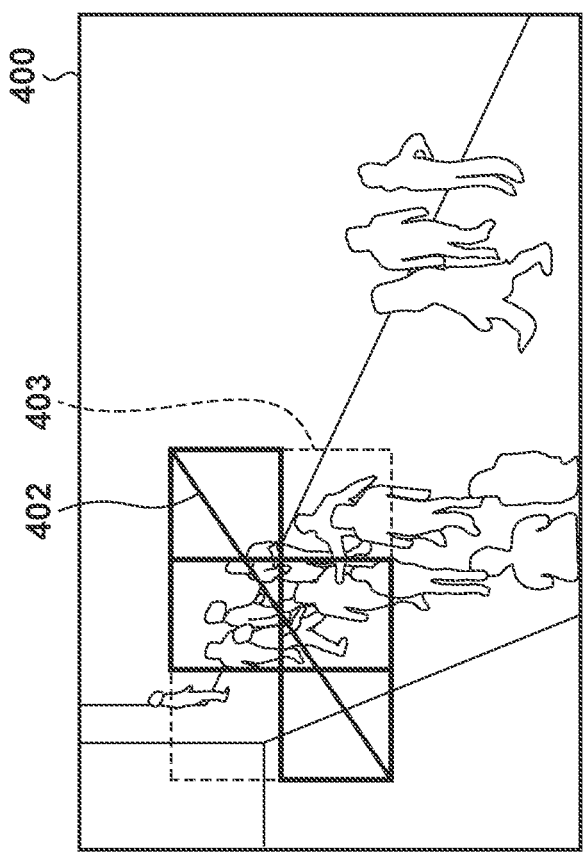
FIGS. 4A and 4B are diagrams illustrating examples of a method for extracting a partial image from divided regions intersecting a detection line.

Hereinafter, embodiments will be described in detail with reference to the attached drawings. Note, the following embodiments are not intended to limit the scope of the claimed invention. Multiple features are described in the embodiments, but limitation is not made to embodiments that require all such features, and multiple such features may be combined as appropriate in an embodiment. Furthermore, in the attached drawings, the same reference numerals are given to the same or similar configurations, and redundant description thereof is omitted.

In a method described in Japanese Patent Laid-Open No. 2009-110152, a human flow is analyzed using the entire image; therefore, if a high-resolution image having a large number of pixels is used, the time required to analyze the human flow increases.

According to an embodiment of the present disclosure, it is possible to reduce the processing load when measuring a flow of a measurement target.

FIG. 1 illustrates an example of a hardware configuration of an image processing apparatus 100 according to an embodiment of the present disclosure. The image processing apparatus 100 includes a control unit 11, a storage unit 12, a calculation unit 13, an input unit 14, an output unit 15, and an I/F unit 16.

The control unit 11 is an apparatus for controlling the entire image processing apparatus 100. The storage unit 12 holds programs and data necessary for the operation of the control unit 11. The calculation unit 13 executes necessary arithmetic processing based on the control of the control unit 11. For example, the calculation unit 13 may perform neural network calculations, which will be described later. The input unit 14 is a human interface device or the like and acquires inputs by user operation. The output unit 15 is a display or the like and presents processing results or the like generated by the image processing apparatus 100 to the user.

The I/F unit 16 is a wired interface such as a universal serial bus, Ethernet (registered trademark), or an optical cable or a radio interface such as Wi-Fi or Bluetooth (registered trademark). Other apparatuses can be connected to the image processing apparatus 100 via the I/F unit 16. For example, the I/F unit 16 can be connected to an image capturing apparatus such as a camera, and the image processing apparatus 100 can acquire a captured image via the I/F unit 16. As another example, the image processing apparatus 100 can transmit a processing result to an external unit via the I/F unit 16. As a further example, the image processing apparatus 100 can acquire programs, data, or the like necessary for operation via the I/F unit 16.

The functions of the image processing apparatus 100, which will be described later, can be realized, for example, by a processor (e.g., the control unit 11) operating in accordance with a program on a memory (e.g., the storage unit 12). The storage unit 12 or other storage media may store such a program. However, at least some functions of the image processing apparatus 100 to be described later may be realized by dedicated hardware. In addition, the image processing apparatus according to the embodiment of the present disclosure may be configured by a plurality of apparatuses connected via a network, for example.

The image processing apparatus 100 may be a typical computer. On the other hand, the image processing apparatus 100 may be an image capturing apparatus such as a digital camera or a network camera. Further, the image processing apparatus 100 can acquire inputs by user operation from an information processing apparatus such as a computer or a smartphone connected via the I/F unit 16 and a network such as the Internet. At this time, the image processing apparatus 100 may generate a user interface for requesting user input and transmit the user interface to such an information processing apparatus for it to be displayed. In addition, the image processing apparatus 100 can output processing results generated by the image processing apparatus 100, such as an extraction result of a partial image or a measurement result of a flow of a measurement target, to such an information processing apparatus.

FIG. 2 illustrates an example of a functional configuration of the image processing apparatus 100 according to an embodiment of the present disclosure. The image processing apparatus 100 includes, as a functional configuration, an acquisition unit 201, a setting unit 202, an extraction unit 203, and a measurement unit 204. The image processing apparatus according to the present embodiment can measure a flow of a measurement target based on a video. Recently, the performance of cameras has improved, making it possible to easily acquire high resolution images; however, the size of such high resolution images tends to be big, causing it to take time to measure a flow of the measurement target. With respect to this problem, high-speed processing is realized by setting a plurality of partial images in the vicinity of the position at which a flow amount is to be measured.

The acquisition unit 201 acquires a video including a plurality of images. An analysis for measuring a flow of the measurement target is performed on the video acquired by the acquisition unit 201. The flow of the measurement target may be a flow of the measurement target on the image or may be a flow of the measurement target in a real space estimated by image analysis. Note that a target of analysis (measurement target) is not particularly limited and may be a person, a vehicle such as a bicycle or a motorcycle, an automobile such as a car or a truck, an animal such as livestock, or the like.

A video is, for example, a stream, a video file, a series of image files stored by frame, a video stored on a medium, or the like, and these include a plurality of frame images. Each of the plurality of images, for example, may be captured at different times by an image capturing apparatus in the same location. The acquisition unit 201 can acquire a video from a solid-state image capturing element such as a CMOS sensor or a CCD sensor or an image capturing apparatus such as a camera including these solid-state image capturing elements. Alternatively, the acquisition unit 201 may acquire video data from a storage apparatus such as a hard disk or SSD, a storage medium, or the like.

The setting unit 202 sets a detection line indicating a position at which a flow of the measurement target is to be measured in a video. In the present embodiment, a flow amount, a direction of a flow, or the like of the measurement target passing the set detection line is measured. The flow amount may be the total number or the number per predetermined time of the measurement target passing the set detection line.

The shape of the detection line is not particularly limited and may be, for example, any bent line, curved line, polygon, circle, or ellipse or a form configured by any closed curve. The detection line may be one or more. For example, a plurality of detection lines that are not connected to each other may be set, or a plurality of detection lines that intersect each other may be set. When a plurality of detection lines are set, it is possible to measure a flow of the measurement target passing the respective detection lines.

Such detection lines may be set based on an image acquired by the acquisition unit 201. For example, the setting unit 202 may acquire a detection line set by the user operating the human interface device or the like connected to the input unit 14 while referring to an image displayed on the output unit 15. In addition, the setting unit 202 may automatically set a detection line based on a region specified by the user. As a specific example, the setting unit 202 can set as a detection line a line passing through the center of one region specified by the user or a line passing between two regions specified by the user. Further, the setting unit 202 may set a detection line according to an operation via the I/F unit 16 instead of the human interface device connected to the input unit 14.

As still another method, the setting unit 202 may set a detection line according to a setting value stored in advance in the storage unit 12 or another apparatus connected via the I/F unit 16.

The setting unit 202 may display a detection line thus set to the user. For example, the setting unit 202 can output information indicating the position of a detection line to the output unit 15 or another apparatus connected via the I/F unit 16. For example, a detection line can be displayed in a superimposed manner on an image acquired by the acquisition unit 201.

The extraction unit 203 extracts a plurality of partial images set in the vicinity of a detection line set by the setting unit 202 from each of the plurality of images in a video acquired by the acquisition unit 201. The partial images thus extracted are used for flow measurement. A specific extraction method will be described later.

Note that the extraction unit 203 may display, for example, the extracted partial images, the position of the partial images in an image acquired by the acquisition unit 201, or the like, as a result of partial image extraction processing to the user. Further, the extraction unit 203 may cooperate with the setting unit 202 to display a result of partial image extraction processing based on a detection line to the user when the detection line is set by the user operating the human interface device or the like connected to the input unit 14. The setting unit 202 can output a result of extraction processing to the output unit 15 or another apparatus connected via the I/F unit 16. FIGS. 4A and 4B, FIGS. 5A to 5D, and FIGS. 6A and 6B illustrate examples of displays of a detection line and a result of partial image extraction processing.

The measurement unit 204 measures a flow of the measurement target passing a detection line using a partial image. That is, the measurement unit 204 can measure a flow of the measurement target based on a detection line set by the setting unit 202 and a partial image extracted by the extraction unit 203. For example, the measurement unit 204 can measure a flow amount of the measurement target that have moved from one region to the other region separated by a detection line by intersecting the detection line. Further, if a detection line is a closed curve surrounding a predetermined region, the measurement unit 204 can measure a flow amount of the measurement target flowing into the region and a flow amount of the measurement target flowing out from the region.

Various methods can be used for flow measurement. Examples include a method for detecting and tracking a person who is the measurement target; a method for directly acquiring a flow amount by estimating positions, moving directions, moving speeds, and the like of a person who is the measurement target; and the like. Examples of algorithms for realizing such measurement methods include a matching method, a method using optical flow, a method using machine learning, and a method using a neural network, for example. In addition, a combination of a plurality of these methods can be used.

For flow measurement, a partial image may be used alone, or a plurality of partial images may be used at the same time. When a plurality of partial images are used, partial images at the same time may be used, or partial images at different times may be used.

An example of a specific processing method by the measurement unit 204 is the following method. First, the measurement unit 204 estimates the position of the measurement target around a detection line at time t1 by inputting each partial image at time t1 to a neural network. Similarly, the measurement unit 204 estimates the position of the measurement target around the detection line at time t2 by inputting each partial image at time t2 to the neural network. This neural network can be trained to estimate the positions of the measurement target (e.g., the heads of people), in an image from the image. Further, as another method for improving estimation accuracy, a neural network trained to estimate the density distribution of the measurement target in an image from the image, and a neural network trained to estimate the positions of the measurement target from density distribution may be used in combination. According to such a method, the measurement unit 204 can estimate, independently for each of the different regions, the positions of the measurement target in a region using a partial image extracted from the region.

Next, the measurement unit 204 estimates the loci of the measurement target between time t1 and time t2 by matching the estimated positions of the measurement target at time t1 and the estimated positions of the measurement target at time t2. As a matching technique, it is possible to use a method of minimizing the cost corresponding to the distance between the measurement targets to be matched, and for example, a Hungarian matching method can be used. When a locus thus estimated intersects the detection line, it can be determined that one measurement target has passed the detection line. Such matching process and locus estimation may be performed at the same time based on the positions of the measurement targets detected from the respective partial images.

However, the method of measuring a flow is not limited to the above method. The measurement unit 204 may, independently for each of the different regions, estimate the loci of the measurement target or measure a flow of the measurement target in each region using a partial image extracted from the region. For example, the measurement unit 204 may not only estimate the positions of the measurement targets for each partial image but also estimate the loci of the measurement target for each partial image. Further, a flow of the measurement target may be estimated by inputting the partial images of the same position at time t1 and time t2 to the neural network and estimating the positions, moving directions, moving speeds, and the like of the measurement target.

A processing example of the image processing apparatus 100 according to the present embodiment will be described with reference to FIG. 3. Hereinafter, an example of performing measurement of a flow amount of people (human flow measurement) will be described, but another measurement target may be used, or other indices of a flow such as a flow direction may be measured.

In step S301, the acquisition unit 201 acquires a video as described above. Note that the acquisition unit 201 may sequentially acquire frame images constituting a video from another apparatus such as an image capturing apparatus or a storage apparatus.

In step S302, the setting unit 202 sets a detection line as described above.

In step S303, the extraction unit 203 extracts a partial image from the image acquired by the acquisition unit 201 based on the detection line set by the setting unit 202. A specific extraction method will be described later.

In step S304, the measurement unit 204 measures a human flow as described above based on the detection line set by the setting unit 202 and the partial image extracted by the extraction unit 203.

(Method of Extracting Partial Image)

Hereinafter, a method by which the extraction unit 203 extracts a partial image in step S303 will be described in detail. Hereinafter, one image in the video (e.g., one frame of the video) acquired by the acquisition unit 201 is referred to as an input image. The method of extracting a partial image from an input image is not limited to a specific method. For example, by the extraction unit 203 extracting a region in the vicinity of the detection line as a partial image and the measurement unit 204 performing measurement based on the partial image, the processing load can be reduced than when the measurement unit 204 performs measurement based on the entire input image. In one embodiment, the extraction unit 203 extracts a partial image, which is a part of the input image, such that the entire detection line is included. However, it is not necessary for all partial images to include the detection line. Depending on the measurement method that the measurement unit 204 uses, further using a partial image extracted from a region close to the detection line may improve the accuracy in measuring a flow amount.

Further, as described above, at least a portion (e.g., human position estimation or flow amount estimation processing) of the measurement processing by the measurement unit 204 may be performed with each of the plurality of partial images as a unit. Therefore, a plurality of partial images may be extracted from an input image. For example, the extraction unit 203 can extract a number of partial images based on the position of a detection line from one image of a plurality of images in a video. That is, in one embodiment, different numbers of partial images are extracted depending on the set detection line. In this case, the extraction unit 203 can extract a plurality of partial images, each of which is a part of the input image, so that each portion of the detection line is included in one of the plurality of partial images.

The measurement unit 204 may perform at least a portion (e.g., human position estimation or flow amount estimation processing) of the measurement processing with an image of a predetermined size as a target. For example, when the measurement unit 204 performs human position estimation using a neural network, a partial image of a predetermined size can be inputted to the neural network. Therefore, in one embodiment, the extraction unit 203 extracts a partial image having a size according to the setting. As will be described later, the size of a partial image may be different depending on the position on an input image from which the partial image is extracted.

Meanwhile, by reducing the number of partial images to be extracted, it is possible to further reduce the load of the measurement processing by the measurement unit 204. For example, the number of partial images can be reduced by reducing overlapping portions between partial images while having each portion of the detection line included in one of the partial images.

Furthermore, as described above, the setting unit 202 may set a detection line of various shapes, a plurality of detection lines, or intersecting detection lines. It is desired that the extraction unit 203 extracts partial images corresponding to such various detection lines.

Although the method of extracting partial images by the extraction unit 203 does not need to satisfy all of the above requirements, several methods for extracting partial images will be described below. In the following method, the extraction unit 203 sets one or more extraction regions in an image region of a video based on the position of a detection line. Then, in one image of the plurality of images, the extraction unit 203 can extract the respective portions included in the respective extraction regions as partial images.

At this time, the extraction unit 203 sets the extraction regions so that a collection of one or more extraction regions encompasses the detection line. By setting the extraction region in this manner, it becomes possible to detect the measurement target passing the detection line using one of the partial images. Meanwhile, it is not essential that the collection of one or more extraction regions encompasses the entirety of the detection line. For example, there may be portions on the detection line, such as occluding objects or obstacles, where the measurement target, such as people, will not be detected. The extraction unit 203 can detect such portions where the measurement target will not be detected. In this case, it is not necessary to set the extraction regions in portions where the measurement target will not be detected. For this reason, the extraction unit 203 may set the extraction regions so that the collection of one or more extraction regions encompasses portions of the detection line excluding the portions set as the portions where the measurement target will not be detected.

Note that although the case where the extraction regions are rectangular will be described below, the shape of the extraction regions is not particularly limited. In addition, each of the plurality of extraction regions may have a different shape from each other.

Figure 4B:
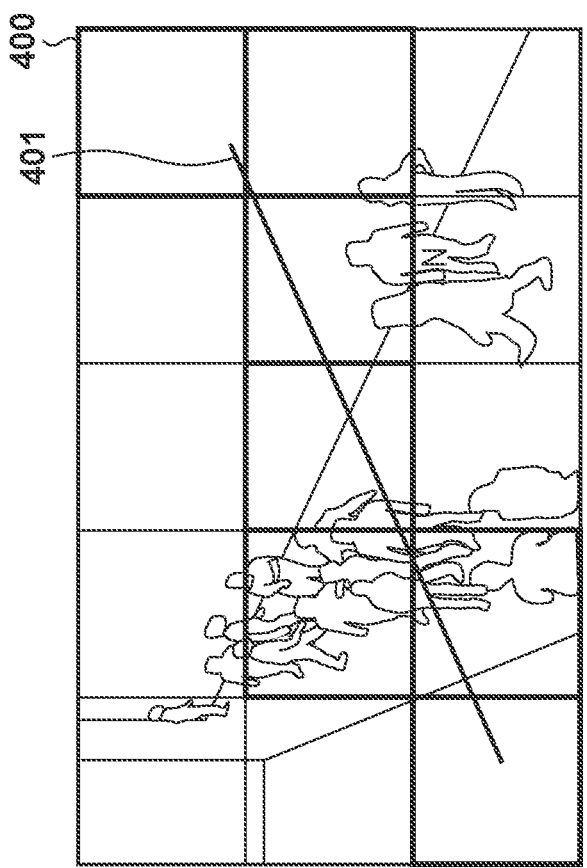

FIGS. 4A and 4B illustrate methods for extracting one or more partial images, each having a fixed size, based on the detection line. In these examples, a plurality of regions are set in the image region of the video. For example, a plurality of regions can be set in the input image or a portion thereof. The collection of the plurality of regions encompasses the detection line. Then, the regions that the detection line intersects among the plurality of regions are set as the extraction regions, and partial images are extracted from the extraction regions.

In the example of FIG. 4A, an input image 400 is divided into a grid shaped region, each grid having a fixed size. In this case, the extraction unit 203 can extract a partial image from each of the grids (i.e., extraction regions) in which the detection line passes.

In FIG. 4B, the extraction unit 203 sets a bounding box 403 encompassing a detection line 402. The bounding box 403 in the example of FIG. 4B coincides with the input image 400 in the vertical direction and the horizontal direction and is the smallest rectangle that encompasses the detection line 402. Further, in the example of FIG. 4B, the bounding box 403 is divided into grids of fixed size. In this case, the extraction unit 203 can extract a partial image from each of the grids (extraction regions) in which the detection line passes.

According to the methods of these FIGS. 4A and 4B, partial images can be extracted in accordance with various detection lines. Note that although the input image 400 and the bounding box 403 were divided into square grids in FIGS. 4A and 4B, the shape of the regions is not particularly limited. The size of each region may be set in advance, or the number of regions (vertical×horizontal) may be set in advance. Furthermore, the size or shape of each region may be different from each other. Such a configuration can also be adopted in other examples as illustrated in FIGS. 5A to 5I.

In the example of FIGS. 4A and 4B, the respective positions of the input image 400 and the bounding box 403 are included in one of a plurality of grids. That is, the respective grids are laid to encompass the input image 400 or the bounding box 403. On the other hand, the respective grids may include a region outside the input image 400 or the bounding box 403, or the respective grids may overlap each other. As described above, in one embodiment, a plurality of regions (e.g., grid shaped regions) are set such that a collection of a plurality of regions encompasses the bounding box 403 and becomes a part of an image region of a video, and an extraction region is selected from these regions.

In addition, it is not necessary to divide the entire input image 400 or bounding box 403 into a plurality of regions. As an example, only a portion of the input image 400 or the bounding box 403 that is necessary for analyzing the flow amount, for example, a portion other than a region where there is an obstacle through which people cannot pass, may be divided into a plurality of regions. Such a configuration can also be adopted in other examples as illustrated in FIGS. 5A to 5I.

FIGS. 5A to 5I illustrate an example in which partial images of different sizes are extracted according to positions in the input image. For example, the size of the extraction region from which the partial image is extracted can be set in accordance with the position in the image at which the extraction region is set or the size of the measurement target in the image in the extraction region.

As a specific example, in an input image captured by a camera or the like, the size of a person (measurement target) may vary depending on the position. In this case, the size of each extraction region can be determined so that the ratio between the size of the extraction region and the size of a person (measurement target) in the image in the extraction region is substantially constant. In this case, each partial image is resized to an image of a predetermined size, and the measurement unit 204 can measure the human flow based on the resized image. According to such a configuration, since the size of a person included in each image to be used by the measurement unit 204 for measurement can be made substantially constant, the accuracy of measurement can be improved. Such a configuration can be used, for example, when the measurement unit 204 performs measurement of the flow amount by inputting an image of a constant size to the neural network.

The size of a person may be, for example, the size of a portion encompassing the head and shoulder of the person, the size of the head of the person, the size of the whole body of the person, or the like. The size of an extraction region may be determined according to the size of a person captured at the position of the extraction region, and in this case, the ratio between the size of the extraction region and the size of the person can be made constant regardless of the actual size of the person. The size of a person at a specific position can be determined using the size of a person in the vicinity of the position detected by, for example, a person recognition process on the input image.

In addition, at a position where a subject farther from the camera appears (e.g., the upper part of the input image), a person appears smaller, and at a position where a subject closer to the camera appears (e.g., the lower part of the input image), a person appears larger. For this reason, the size of the extraction region may be determined according to the position of the extraction region and may be smaller in the upper part and larger in the lower part of the input image, for example.

Figure 5A:
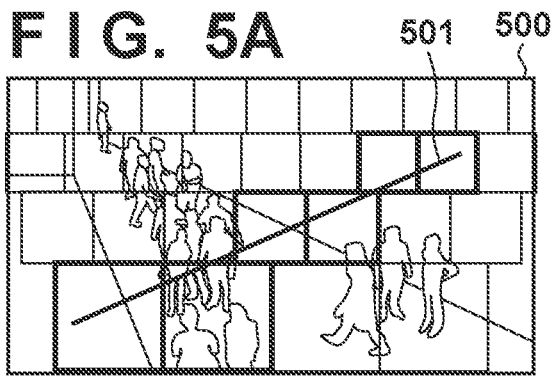
FIGS. 5A to 5I are diagrams illustrating examples of a method for extracting partial images of various sizes.
Figure 5B:
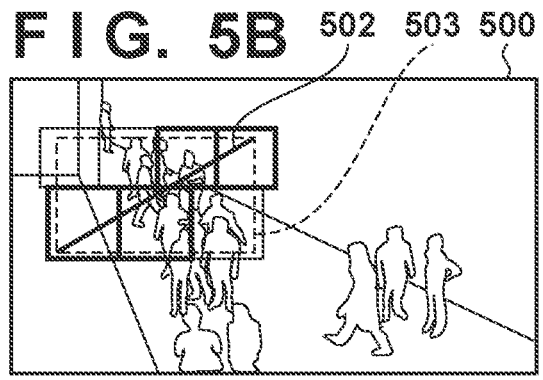

FIG. 5A illustrates an example in which an input image 500 is divided into rectangular regions of various sizes and partial images are extracted from the regions intersecting with a detection line 501. In addition, FIG. 5B illustrates an example in which a bounding box 503 encompassing the detection line 502 set in the same manner as in FIG. 4B is divided into rectangular regions of various sizes, and partial images are extracted from the regions intersecting with the detection line 502. In FIGS. 5A and 5B, a plurality of regions are set so that the ratio of the size of a region to the size of a person is substantially constant. The positions and sizes of the plurality of regions illustrated in FIG. 5A may be set in advance. The region illustrated in FIG. 5B may be set by repeating the process of arranging a group of rectangular regions horizontally along the lower edge of the bounding box 503 and horizontally arranging another group of rectangular regions thereon. In this case, the size of each rectangular region can be set according to the size of a person captured in the vicinity of the group of rectangular regions or the position of the group of rectangular regions in the vertical direction.

Figure 5C:
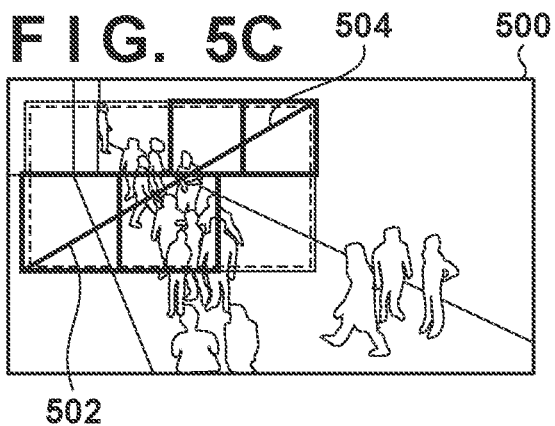

When the detection line 502 illustrated in FIG. 5B is extended like a detection line 504 in FIG. 5C, a method of changing the size of a region so as to encompass the detection line 504 is conceivable. On the other hand, by encompassing the detection line 504 in a region of a size corresponding to the position of the extended detection line 504 as in FIG. 5D, the ratio of the size of a partial image to the size of a person can be maintained before and after the extension.

Figure 5D:
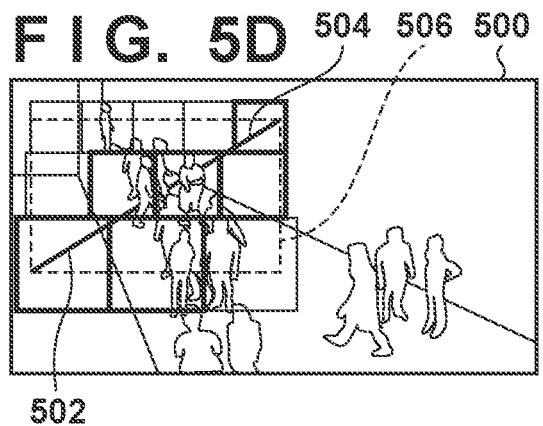

When the detection line 502 is extended as in FIG. 5D and the like, the region occupied by the arranged group of regions may be larger than a bounding box 506 encompassing the extended detection line 504. In this case, the relative positional relationship between the group of regions and the bounding box 506 can be freely determined such that the group of regions encompasses the bounding box 506.

Meanwhile, the methods illustrated in the following FIGS. 5E to 5I are examples of the method of setting the relative positional relationship between the group of regions and the bounding box 506. In these examples, a relative positional relationship is set based on an upper margin 507, a lower margin 508, a left margin 509, or a right margin 510 indicating a distance between the boundary of the group of regions and the boundary of the bounding box.

In the flow amount measurement in step S304, it is possible to use the result of detection of a person, who is the measurement target, from the partial images. Since the detection of people is performed based on the information held in the partial image, it is expected that the accuracy in detection of people increases as the amount of information that can be used for the detection increases, and the accuracy of the flow amount measurement also increases. Here, where the accuracy in detection of people is the highest is at the center of the partial image. On the other hand, since the information from the region beyond the boundary of the partial image cannot be used, the amount of information that can be used for detecting people decreases as the distance from the center of the partial image increases, and thereby, the detection accuracy tends to decrease. Therefore, the accuracy of the flow amount measurement in step S304 tends to decrease in the regions close to the border of the partial image. By providing the margin as described above evenly around the bounding box and separating the detection line as far as possible from the boundary of the partial images, it is expected that the accuracy in detection of people in the vicinity of the detection line will improve and that the accuracy in flow amount measurement will also improve.

Figure 5E:
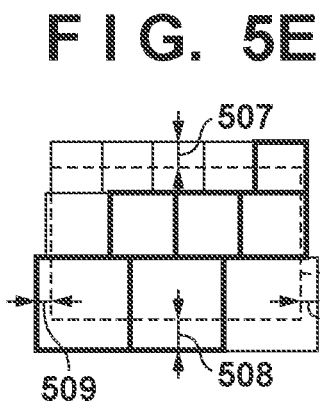

For example, in FIG. 5E, the position of the group of regions is set so that the widths of the upper margin 507 and the lower margin 508 becomes equal and the widths of the left margin 509 and the right margin 510 becomes equal.

Figure 5F:
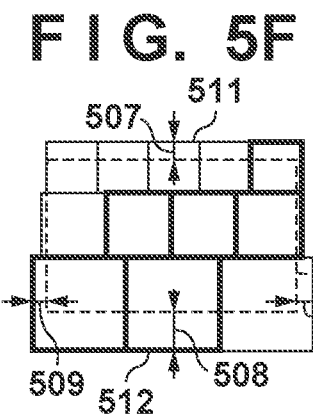
Figure 5G:
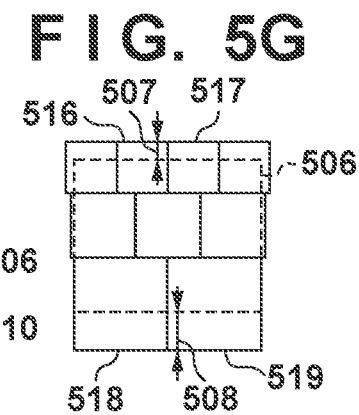

In the example of FIG. 5F, the widths of the left margin 509 and the right margin 510 are equal, and the ratio of the widths of the upper margin 507 and the lower margin 508 coincides with the ratio of the sizes of the region located at the upper edge and the region located at the lower edge. Here, as the region located at the upper edge, a region 511 located at the center of the upper side of the bounding box 506 can be used, and as the region located at the lower edge, a region 512 located at the center of the lower side of the bounding box 506 can be used. FIG. 5G illustrates a case where the midpoints of the upper and lower sides of the bounding box 506 are located at the boundaries of two regions. Also in this example, the ratio of the widths of the upper margin 507 and the lower margin 508 coincides with the ratio of the sizes of the region located at the upper edge and the region located at the lower edge. In FIG. 5G, the size of a region 516 or a region 517 located at the center of the upper side of the bounding box 506 can be used as the size of the region located at the upper edge. As another example, as the size of the region located at the upper edge, a size determined from the size of the region 516 and the size of the region 517, for example, an average size may be used. Similarly, as the size of the region located at the lower edge, the size of a region 518 or a region 519 located at the center of the upper side of the bounding box 506 or a size determined from the size of the region 518 and the size of the region 519 can be used.

Figure 5H:
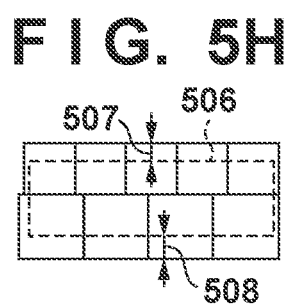
Figure 5I:
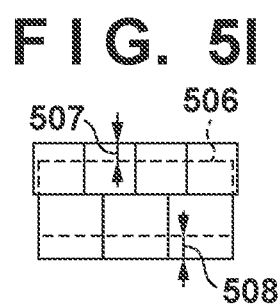

In FIG. 5H, the midpoint of the lower side of the bounding box 506 is located at the boundary of two regions, and in FIG. 5I, the midpoint of the upper side of the bounding box 506 is located at the boundary of two regions. In the example of FIG. 5H, the width of the upper margin 507 can be determined as in the example of FIG. 5F, and the width of the lower margin 508 can be determined as in the example of FIG. 5G. In the example of FIG. 5H, the width of the upper margin 507 can be determined as in the example of FIG. 5F, and the width of the lower margin 508 can be determined as in the example of FIG. 5G.

In the examples of FIGS. 4A to 5I, partial images are extracted from regions intersecting with the detection line among the plurality of set regions. Meanwhile, the extraction unit 203 may set one or more extraction regions so that one or more extraction regions are arranged along the detection line, and extract a partial image from each of the set extraction regions.

Figure 6A:
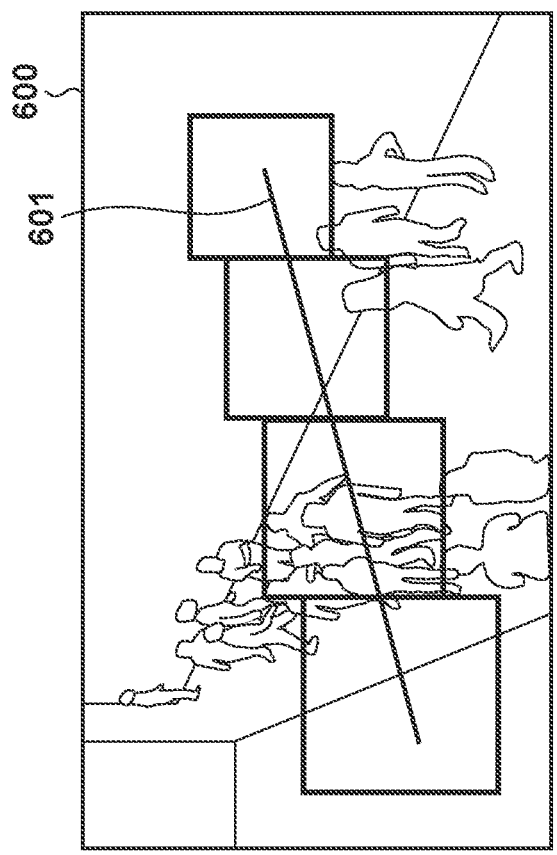
FIGS. 6A and 6B are diagrams illustrating examples of a method for extracting a partial image along a detection line.
Figure 6B:
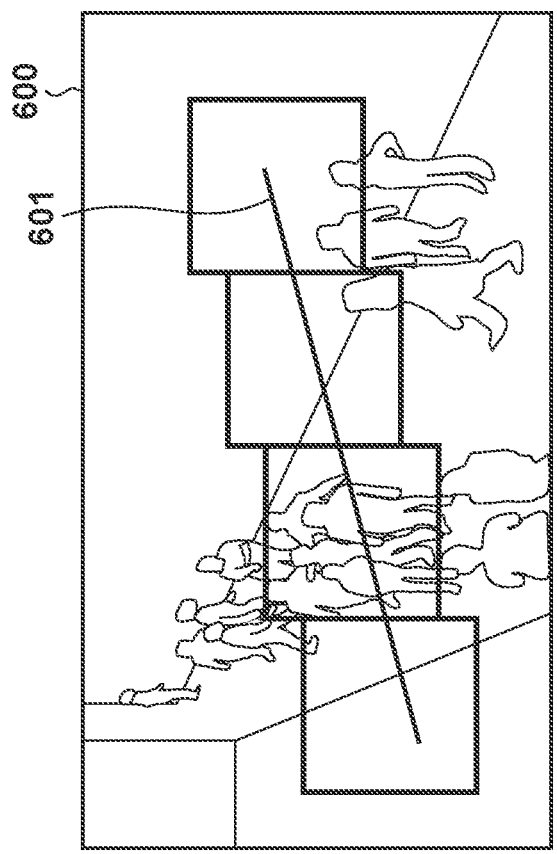

FIGS. 6A and 6B illustrate examples of such an extraction method. In these examples, a plurality of extraction regions are set such that the collection of the plurality of extraction regions encompasses a detection line 601. In FIG. 6A, a plurality of extraction regions having the same shapes are arranged along the detection line 601, and in FIG. 6B, a plurality of extraction regions having varying sizes are arranged along the detection line 601. The sizes of the extraction regions in FIG. 6B can be set so that the ratios of the sizes of the partial images extracted from the extraction regions and the sizes of the people are substantially constant as in FIGS. 5A to 5I.

Even by the configuration in which the extraction regions are arranged in this way along the detection line, it is possible to set the group of extraction regions encompassing the detection line without a gap so as to be able to measure a person, who is the measurement target, passing over the detection line without omission. According to such a configuration, it is possible to support various detection lines while the number of partial images to be extracted is reduced and the measurement process by the measurement unit 204 using the partial images is expected to become faster.

Figure 7A:
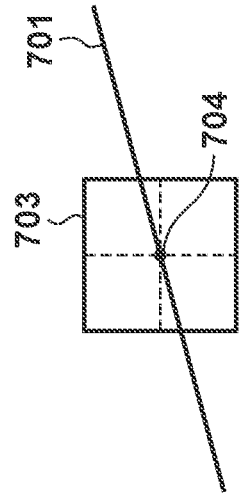
FIGS. 7A and 7B are diagrams illustrating examples of a method for arranging an extraction region on a detection line.

When the group of extraction regions is set so as to encompass the detection lines, the extraction regions can be arranged so that each of the extraction regions includes a detection line 700, as illustrated in FIG. 7A, for example. FIG. 7A illustrates an extraction region 701 disposed so as to include an end point of the detection line 700 and an extraction region 702 disposed in the middle of the detection line 700.

Figure 7B:
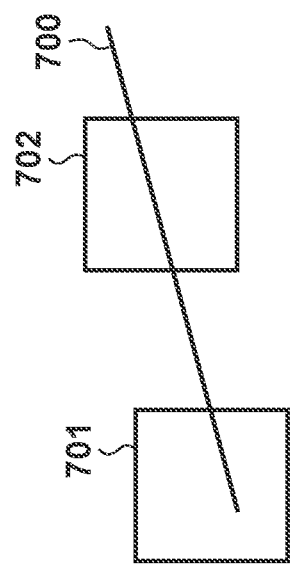

Under the constraint that the extraction regions include the detection line 700, various methods of setting the extraction regions are conceivable. An example of a specific setting method is a method of arranging the extraction regions such that the representative points of the extraction regions are positioned on the detection line 700. The representative point of the extraction region can be defined as a point at a predetermined relative position with respect to the extraction region. In the example of FIG. 7B, a representative point 704 of the figure formed by the boundary line of an extraction region 703 is defined, and the extraction region 703 is set so that the representative point 704 is positioned on the detection line 700. In this example, the center of gravity of the figure formed by the boundary line of the extraction region 703 is used as the representative point 704 of the extraction region 703. However, the representative point is not limited to the center of gravity, and may be a vertex, a midpoint of a side or the like. Further, number of representative points of the extraction region is not limited to one, and each extraction region may have a plurality of representative points. As described above, by using the constraint based on the relationship between the representative points of the extraction regions and the detection line 700, it is possible to easily determine the arrangement of the extraction regions.

The method of arranging the representative points of the extraction regions on the detection line is not particularly limited. For example, if the detection lines are described in mathematical equations, such as straight lines, algebraic curves, and piecewise polynomials such as spline curves, the extraction regions may be arranged such that the coordinates of the representative points of the extraction regions satisfy these equations. Also, a method of referring to a table storing coordinates of several points on a detection line may also be used. In this case, the coordinates of the points on the detection line not included in the table can be acquired from the coordinates of the neighboring points by interpolation or the like. When such a table is used, the extraction regions can be arranged such that the coordinates of the representative points of the extraction regions coincide with the coordinates on the detection line acquired based on the table.

Figure 8A:
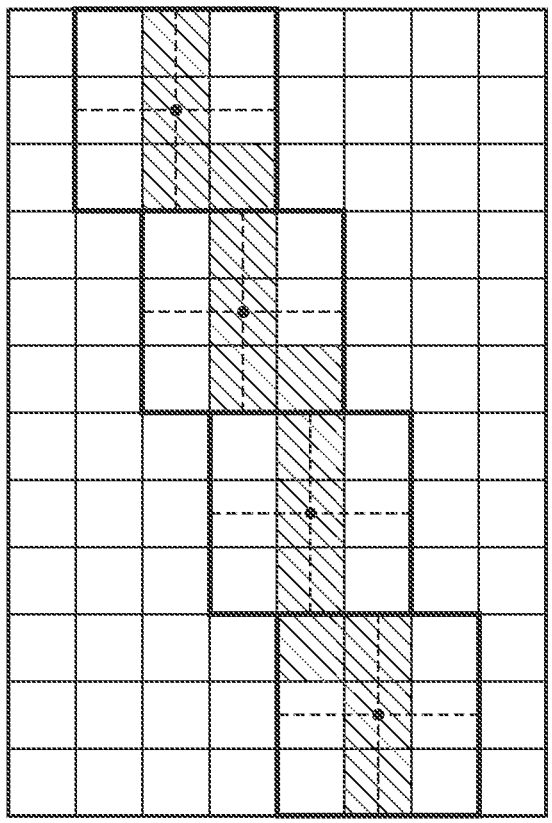
FIGS. 8A and 8B are diagrams illustrating examples of a method for arranging an extraction region on a rasterized detection line.
Figure 8B:
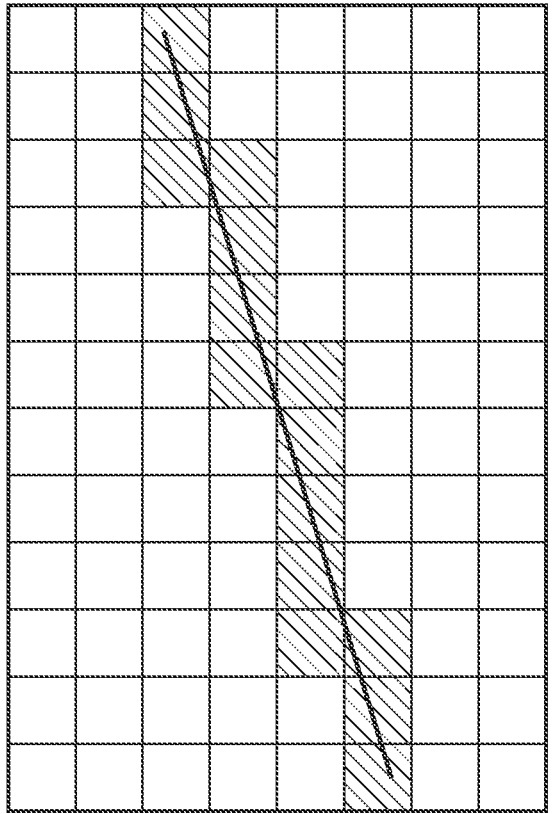

As yet another method, the extraction regions may be set such that the representative points of the extraction regions are located on the pixel representing the rasterized detection line. In the example of FIG. 8A, the detection line is rasterized on the grid points, and the extraction regions are arranged so that the representative points of the extraction regions coincide with the grid points thus acquired. The input image, which is a raster image, has a structure in which pixels are arranged on the grid points. Therefore, by defining the extraction regions on the basis of the grid points and arranging the representative points of the extraction regions on the rasterized detection line, a group of extraction regions can be laid to encompass the detection line as illustrated in FIG. 8B. The algorithm used for rasterization is not particularly limited. In addition, when there is a difference in pixel values such as shading or hue in each pixel in the result of rasterization, it may be determined whether or not to dispose the representative point of an extraction region at a grid point according to the pixel value, or the representative point of the extraction region may be arranged at the grid point regardless of the size of the pixel value. Although FIGS. 8A and 8B illustrate an example in which the detection line is a line segment, such a method is applicable regardless of whether the detection line is represented by a mathematical equation, whatever shape the detection line has, be it a bent line or a curve, or the like, for example.

Figure 9A:
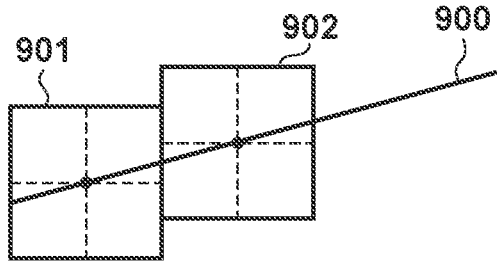
FIGS. 9A to 9E are diagrams illustrating examples of a method for arranging a plurality of extraction regions on a detection line.
Figure 9B:
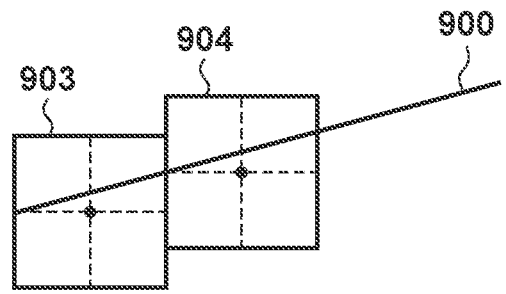

FIGS. 9A to 9E illustrate examples of a method for arranging extraction regions along a detection line. Here, a case where the extraction regions are arranged so that the representative points of the extraction regions are located on the detection line will be described. In FIG. 9A, an extraction region 902 is newly arranged so as to adjoin an extraction region 901 which has already been placed on a detection line 900 and the center of gravity which is the representative point of the extraction region is located on the detection line 900. The extraction region 902 encompasses a portion of the detection line 900. In FIG. 9B, an extraction region 904 is newly arranged so as to adjoin an extraction region 903 which has already been placed on the detection line 900 and the midpoint of the left side which is the representative point of the extraction region is located on the detection line 900. This extraction region 904 also encompasses a portion of the detection line 900.

Depending on the shape of the detection line, the group of extraction regions may not be able to encompass the entire detection line when the extraction regions are arranged by the above method. For example, in the example of FIG. 9C in which only the center of gravity is used as the representative point, if an extraction region 907 is arranged so as to adjoin an extraction region 906 which has already been placed on a detection line 905, the detection line cannot be encompassed. In such a case, a new extraction region can be arranged such that another representative point is located on the detection line 905. For example, as in the example of FIG. 9D, an extraction region 908 adjoining the extraction region 906 can be arranged such that the midpoint of the left side, which is one of the representative points of the extraction region 908, is located on the detection line 905. In this example, an extraction region 909 adjacent to the extraction region 908 is further arranged so that the center of gravity, which is a representative point, is located on the detection line 905.

Figure 9C:
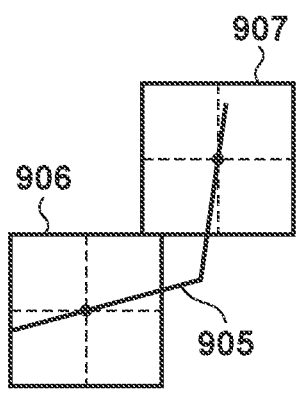
Figure 9D:
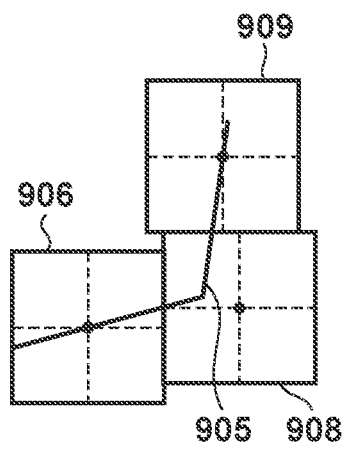
Figure 9E:
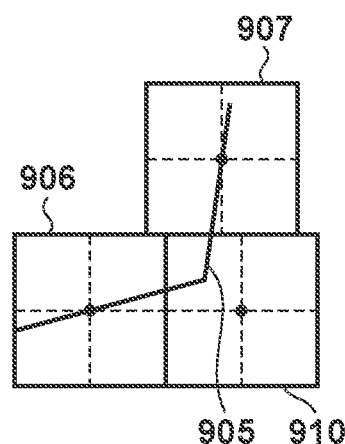

In addition, in the example of FIG. 9C, another extraction region adjacent to the other extraction regions may be further set so that the detection line can be encompassed by the group of extraction regions. For example, an extraction region 910 may be arranged as in FIG. 9E so as to include the detection line 905 that could not be encompassed. In this example, the arrangement of the extraction region 910 is uniquely determined by the extraction region 906 and the extraction region 907. In this case, it is not necessary to use a representative point of the extraction region 910.

Figure 10A:
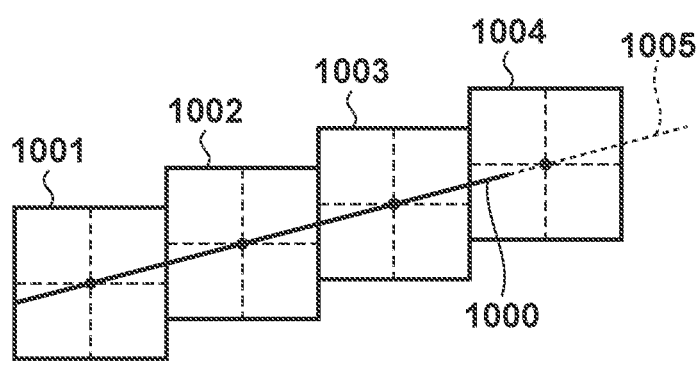
FIGS. 10A and 10B are diagrams illustrating examples of a method for arranging an extraction region on an extended detection line.

As a further example, the extraction unit 203 may set the extraction regions such that the representative point of an extraction region is located on the extended line of the detection line. As described above, by virtually extending at least a portion of the detection line and arranging an extraction region along the virtually extended detection line, the group of extraction regions can be arranged so as to encompass the entire detection line. In FIG. 10A, an extraction region 1001, an extraction region 1002, and an extraction region 1003 are arranged along a detection line 1000. An extraction region 1004 is also arranged along a line 1005 acquired by virtually extending the detection line 1000. In this example, the extraction region 1004 is arranged so that the representative point of the extraction region 1004 is located on the line 1005. In this example, four extraction regions encompass the detection line 1000. According to such a method, even when the length of the detection line is insufficient, the group of extraction regions can be laid so as to encompass the detection line.

Figure 10B:
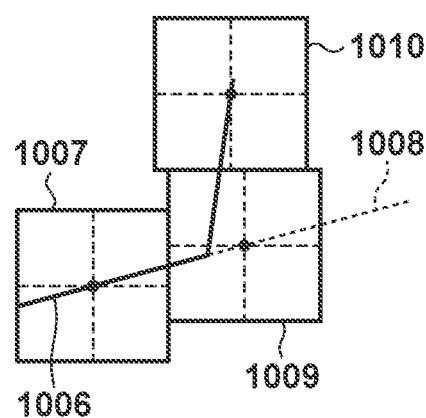

Further, in the example of FIG. 10B, after an extraction region 1007 is arranged on a detection line 1006 which is a bent line, an extraction region 1009 is arranged along a line 1008 which is virtual extension of one line segment constituting the detection line 1006, and then an extraction region 1010 is further arranged.

The method of virtually extending the detection line is not particularly limited, but for example, a detection line that is a line segment can be extended in the same direction as the line segment. A curved detection line may also be extend along a tangent at an end point of the detection line or may be extended by joining any other line segment.

As described above, when there is a portion on the detection line, such as an occluding object or an obstacle, where the measurement target, such as a person, is not detected, extraction regions does not need to be disposed in such a portion. For example, the extraction regions may be spaced apart by a size of a portion such as an occluding object or an obstacle.

Figure 11A:
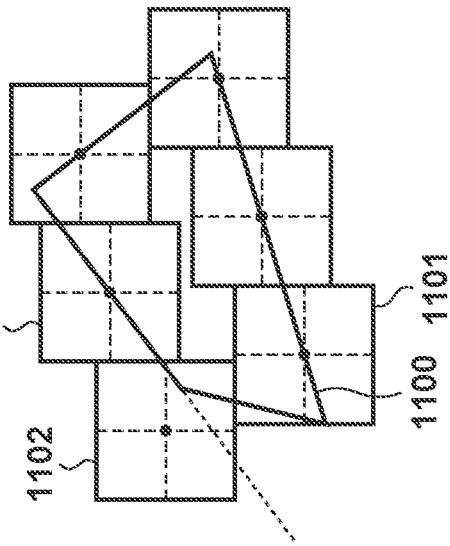
FIGS. 11A to 11D are diagrams illustrating examples of a method for extracting a partial image along various detection lines.

Depending on the shape of the detection line, if the extraction regions are arranged according to the above method, the extraction regions may overlap with each other. For example, when an extraction region A is disposed and then an extraction region B is disposed so that the representative point is located on the detection line, the extraction region A and the extraction region B may overlap each other. In the example of FIG. 11A, extraction regions are disposed counterclockwise starting from an extraction region 1101 along a detection line 1100, which is a quadrilateral consisting of four line segments. The last extraction region 1102 is arranged on an extended line of one line segment constituting the detection line 1100. In this example, an overlapping region 1103 of the extraction region 1101 and the extraction region 1102 is generated, and the overlapping region 1103 includes a part of the detection line 1100.

Figure 11B:
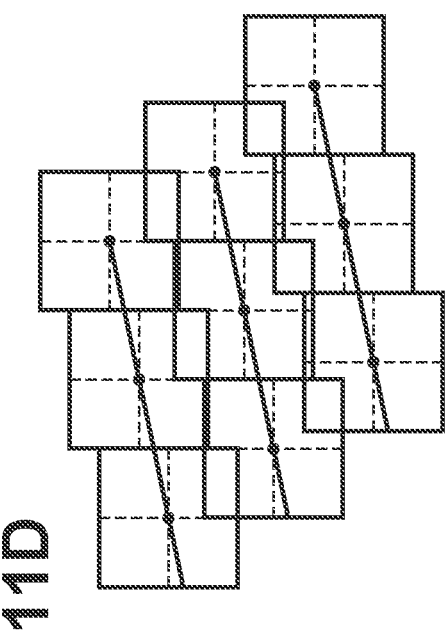

In such a case, by moving the extraction region 1102 by the width of an overlap between the extraction region 1101 and the extraction region 1102, the overlap of the extraction regions can be eliminated. As in FIG. 11B, the extraction region 1102 arranged last is shifted upward by the overlap width while maintaining contact with an extraction region 1104 arranged immediately before the extraction region 1102. The overlapping region 1103 can be eliminated by such processing, and thereby, it is possible to prevent flow amount measurement from being performed in an overlapping manner in the overlapping region 1103 even when there is a person, who is the measurement target, in the overlapping region 1103.

As another method, when the extraction regions are overlapping with each other, the extraction regions may be moved according to a user instruction via a human interface device or the like connected to the input unit 14 or via the I/F unit 16, thereby eliminating the overlap of the extraction regions.

Meanwhile, in some cases, it is impossible to prevent the extraction regions from overlapping each other. For example, as in FIG. 11C, when the extraction region is arranged counterclockwise starting from an extraction region 1107 along a detection line 1105, the overlap of the extraction regions cannot be eliminated even if the last extraction region 1108 is moved.

When a first partial image and a second partial image have an overlapping portion as described above, the measurement unit 204 can exclude the overlapping portion from the measurement target in the first partial image or the second partial image. For example, in the flow amount measurement in step S304, it is possible to employ a method in which while the entire partial image from one of the extraction regions overlapping each other is used, a portion corresponding to the overlapping region from the other partial image is not used. An example of a method for not using the overlapping region in the partial image in the flow amount measurement, for example, is a method of filling the overlapping region in the partial image with a pattern in which people (the measurement target) are not recognized in step S304. An example of such a pattern is a pattern in which a human-like shape cannot be recognized, such as a monochrome pattern of black, white, or the like. Since a human-like shape will not be recognized from a region filled with such a pattern, a human flow is not measured from an image in this region.

Figure 11C:
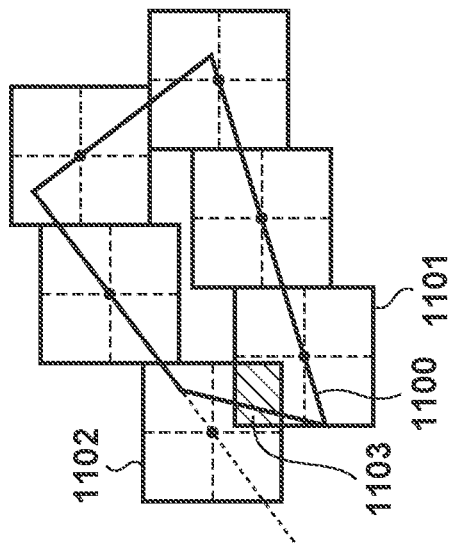

In the example of FIG. 11C, while the partial image from the extraction region 1107 is used as is, the portion of an overlapping region 1109 in the partial image from the extraction region 1108 can be filled in with black. When there is a person, who is a measurement target, in the overlapping region 1109, the person can be recognized from the portion of the overlapping region 1109 in the partial image from the extraction region 1107. On the other hand, since the overlapping region 1109 is filled with black in the partial image from the extraction region 1108, this person is not recognized. With such a configuration, even if there is a person, who is a measurement target, in the overlapping region 1109, it is possible to prevent the person from being recognized in an overlapping manner in a plurality of partial images and from being measured in an overlapping manner.

As another method, the extraction unit 203 can input the position of the overlapping region 1109 to the measurement unit 204. In this case, the measurement unit 204 can measure the flow so as not to measure people in the overlapping region in an overlapping manner. For example, the measurement unit 204 can prevent a person from being measured in an overlapping manner by excluding the detection result from the overlapping region 1109 from the detection result for the partial image from the extraction region 1108.

Figure 11D:
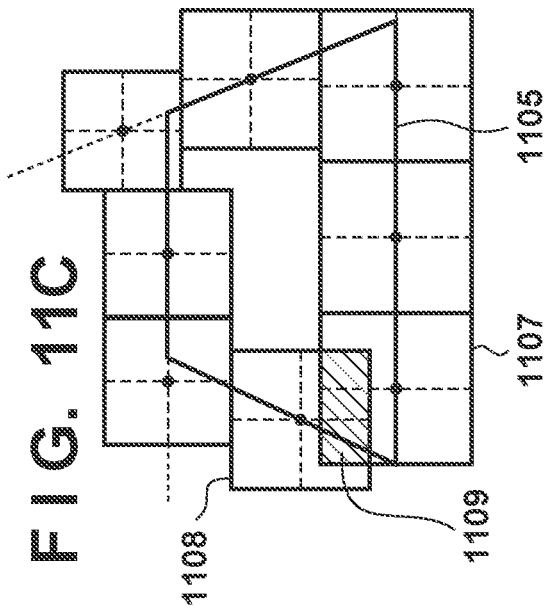

Meanwhile, when overlapping regions do not include a detection line as illustrated in FIG. 11D, the effect of the presence of overlapping regions on the flow amount measurement is considered to be small. For this reason, the partial images from extraction regions overlapping each other can be used as they are in the flow amount measurement in step S304.

Note that when the partial images include an overlapping region as described above, the extraction unit 203 may notify the user of that via the output unit 15 or another apparatus connected via the I/F unit 16.

Figures 12A, 12B:
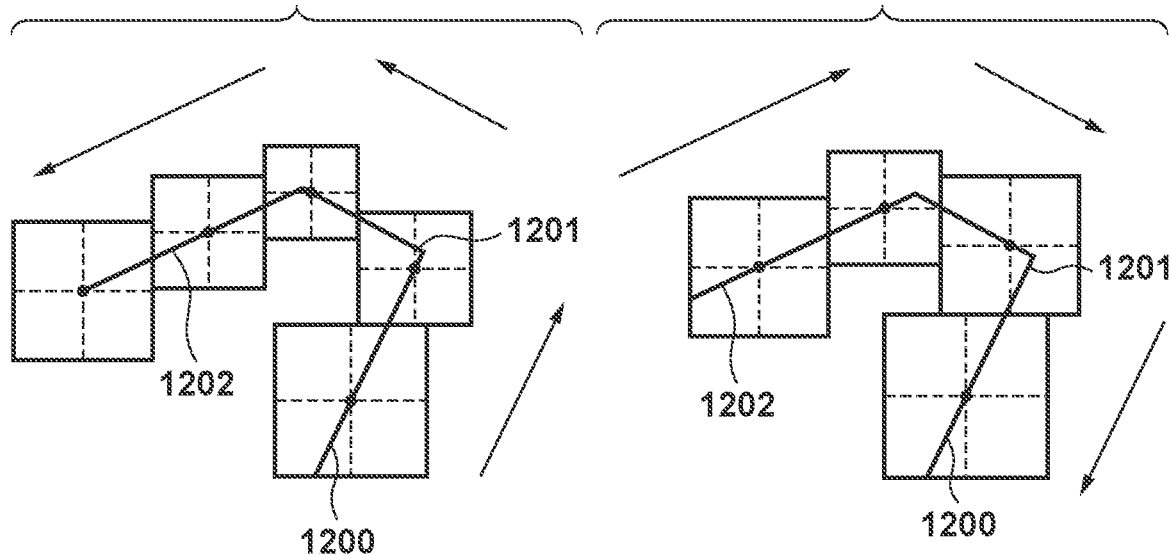
FIGS. 12A and 12B are diagrams illustrating a relationship between order of arrangement of extraction regions and a partial image to be extracted.

When the extraction regions are arranged along the detection line, the positions of the extraction regions may be changed if the order of arrangement is changed. For example, in FIGS. 12A and 12B, the extraction regions are arranged along the detection line consisting of a line segment 1200, a line segment 1201, and a line segment 1202. In the example of FIG. 12A, the extraction regions are arranged in order starting from the line segment 1200, then the line segment 1201, and then the line segment 1202. In this example, five partial images are acquired in the end. Meanwhile, in the example of FIG. 12B, the extraction regions are arranged in order starting from the line segment 1202, then the line segment 1201, and then the line segment 1200. In this example, four partial images are acquired in the end. Thus, comparing FIG. 12A and FIG. 12B, it is possible to perform the measurement of flow amount on the detection line using less partial images in the case of FIG. 12B.

In such cases, since the flow amount measurement process in step S304 can be performed at a higher speed as the number of partial images is smaller, it is possible to adopt a method of arranging the extraction regions such that the number of partial images is smaller. For example, when the results illustrated in FIGS. 12A and 12B are acquired, the result of FIG. 12B in which the number of partial images is smaller can be adopted.

As described above, when the order of arranging the extraction regions is reversed, a series of partial images different from the case of the forward direction may be acquired. The method of changing the order of arrangement is not limited to this method. For example, a series of partial images that are different from the forward and reverse directions may be acquired when arranging the extraction regions starting from an extraction region located part way through the detection line and then in two directions along the detection line. Hereinafter, one or more extraction regions set based on the detection line in this manner will be referred to as an extraction region setting pattern. One setting pattern may indicate, for example, the placement of each of a plurality of extraction regions set to encompass a detection line. That is, the extraction unit 203 can generate a plurality of setting patterns each indicating the setting of one or more extraction regions by repeatedly setting one or more extraction regions based on the position of the detection line.

Similarly, a different series of partial images may be acquired depending on the position of the initial extraction region located on the detection line. For example, as illustrated in FIGS. 13A to 13C, it is possible to search for the optimal extraction region setting pattern by repeatedly arranging the extraction regions while changing the position of the extraction region initially arranged on the detection line.

Figures 13A, 13B:
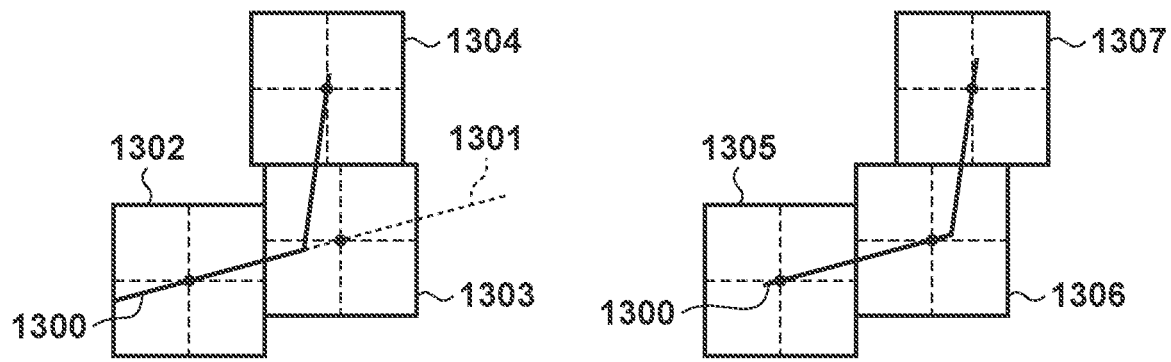
FIGS. 13A to 13C are diagrams illustrating a relationship between a first-arranged extraction region and a partial image to be extracted.
Figure 13C:
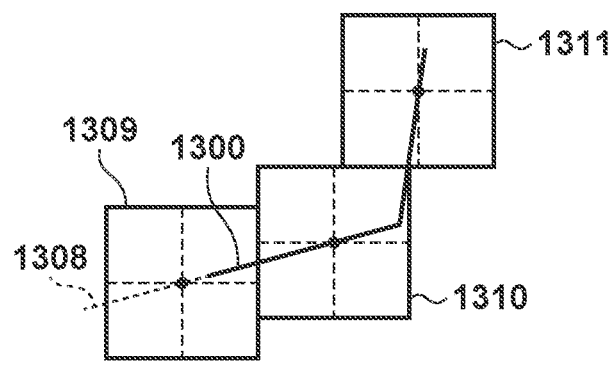

In FIG. 13A, an extraction region 1302 on a detection line 1300 is arranged first, and then an extraction region 1303 on an extended line 1301 of one line segment constituting the detection line 1300 and an extraction region 1304 on the detection line 1300 are arranged. In FIG. 13B, an extraction region 1305 on the detection line 1300 is arranged first, then an extraction region 1306 and an extraction region 1307 on the detection line 1300 are arranged. In this example, the extraction regions can be arranged without using an extended detection line. In FIG. 13C, an extraction region 1309 on an extended line 1308 of one line segment constituting the detection line 1300 is arranged first, then an extraction region 1310 and an extraction region 1311 on the detection line 1300 are arranged. By changing the position of the extraction region to be placed first as described above, the arrangement of the group of extraction regions is also changed.

In the search of extraction region setting patterns, a set of points acquired by rasterizing the detection line can be used as candidates for starting points as illustrated in FIG. 14A. In this case, since the number of repetitions can be reduced to (the number of candidates for the starting point)×(the number of representative points) by determining the representative points of the extraction region in advance as illustrated in FIG. 14B, the setting patterns can be searched efficiently. In addition, the search range may be expanded by using as candidates for the starting point a set of points acquired by extending the detection line and then rasterizing the detection line as illustrated in FIG. 14C. In the example of FIG. 14C, the detection line is extended so that the end of the detection line prior to the extension is overlapped with the boundary of the extraction region when the extraction region is arranged so that a representative point is located at the end of the extended detection line.

When a plurality of setting patterns are acquired in this manner, the extraction unit 203 can select one of the plurality of setting patterns. The extraction unit 203 can select a setting pattern based on various criteria or based on a user instruction. For example, as described above, the extraction unit 203 can select one of a plurality of setting patterns in accordance with the number of extraction regions set in each setting pattern. Specifically, the extraction unit 203 can evaluate the number of extraction regions for each of the plurality of extraction region setting patterns, and adopt a setting pattern in which the number of extraction regions is the smallest. On the other hand, the criterion for adopting the setting pattern is not limited to the number of extraction regions. For example, the setting pattern may be selected based on another criterion as described below, or two or more criteria may be used in combination. As an example, when there are a plurality of setting patterns in which the number of extraction regions is the smallest, the extraction unit 203 may select one of them based on an index other than the number of extraction regions.

The sum of the areas of the overlapping portions of the extraction regions may be used as an index other than the number of extraction regions, for example. In this case, the extraction unit 203 can preferentially adopt an extraction region setting pattern in which the sum of the areas of the overlapping portions is smaller. By reducing the overlapping regions, there is an effect that it is possible to set an effective target range for the analysis processing and to prevent the same object from being analyzed in an overlapping manner. In addition, when the size of the extraction region varies for each extraction region, the total Ssum of the area of the extraction regions or the size Smin of the smallest of the extraction regions can be used as an index. When it is considered that the larger the partial images are, the larger the quantity of information is, the extraction unit 203 can preferentially adopt a setting pattern in which Ssum or Smin is larger. Also, a lower limit may be placed on the value of Smin so that partial images that are too small are not used. This method is effective when, for example, the ratio between the size of an extraction region and the size of a person is made substantially constant, and there is a strong tendency that a person who is far appears small as in the case where the input image is a wide-angle image. Furthermore, when the size of the partial image affects the processing time of the flow amount measurement in step S304, the extraction unit 203 can preferentially adopt a setting pattern in which Ssum is smaller. Also in this case, a lower limit can be placed on the value of Smin so that extremely small partial images are not used.

As another index, it is possible to use the length L of the portion of the detection line included in each extraction region. As described above, the accuracy in detection of people in the vicinity of the detection line is improved by distancing the detection line as far as possible from the boundary of the extraction region, and thereby, it is expected that the accuracy in flow amount measurement will also improve. In view of such a tendency, this length L can be used as an evaluation index for an extraction region setting pattern.

Figure 15A:
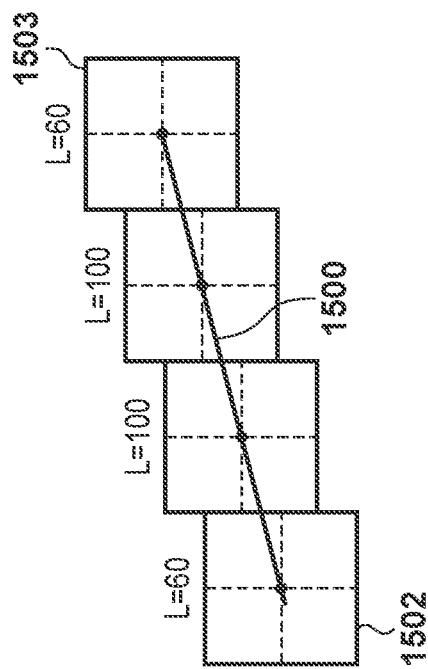
FIGS. 15A and 15B are diagrams illustrating examples of a method for evaluating a method for extracting a partial image.

For example, in the example of FIG. 15A, the length of the part of a detection line 1500 included in an extraction region 1501 is shorter than that of the other extraction regions, and the length L=30. On the other hand, in the example of FIG. 15B, the lengths of the portions included in an extraction region 1502 and an extraction region 1503 in the detection line 1500 are equal, and L=60. Further, when the minimum value of L (Lmin) for each extraction region is compared between FIG. 15A and FIG. 15B, Lmin=30 in FIG. 15A, and Lmin=60 in FIG. 15B.

Figure 15B:
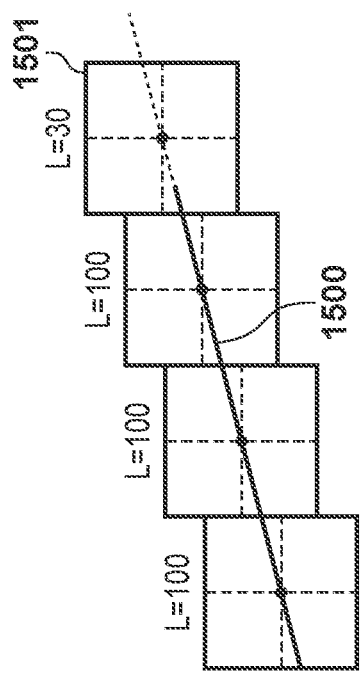

The arrangement of FIG. 15B is more balanced than the arrangement of FIG. 15A. That is, in FIG. 15A, since in the extraction region 1501, the detection line is not present in the vicinity of the central region in which the flow amount measurement accuracy is high, the central region of the partial image from this extraction region is not used for flow amount measurement. On the other hand, in FIG. 15B, the central region can be used for flow amount measurement in all the partial images. Thus, by employing a setting pattern in which Lmin is larger as in FIG. 15B, it is expected that the balance in accuracy will improve and the measurement accuracy will also improve. In this manner, the extraction unit 203 can preferentially adopt setting patterns having a larger Lmin.

When a plurality of extraction region setting patterns are acquired, the extraction unit 203 can also indicate the respective setting patterns, the extraction results according to the respective setting patterns, or the above indices of the respective setting patterns to the user via the output unit 15 or the like. In this case, the user, by operating the human interface device or the like connected to the input unit 14 or by an operation via the I/F unit 16, may select a setting pattern to be used for flow amount measurement in step S304.

As another measure against the tendency for the accuracy in flow amount measurement in step S304 to decrease in the boundary region of a partial image, a central region may be defined in an extraction region and the flow amount measurement in step S304 may be performed in the central region.

Figure 16A:
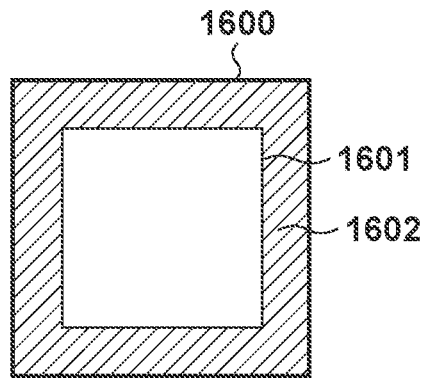
FIGS. 16A to 16D are diagrams explaining a central region and a margin region of an extraction region.

In such a case, one extraction region may include a central region and a margin region around the central region. As illustrated in FIG. 16A, for example, a method of defining a central region 1601 and a margin region 1602 surrounded by the boundary line of an extraction region 1600 and the boundary line of the central region 1601 inside the extraction region 1600 is an example of a method of defining a central region in an extraction region. In the example of FIG. 16A, the central region 1601 is a rectangle, but the shape of the central region 1601 is not particularly limited. For example, the shape of the central region 1601 may be any shape included within the extraction region 1600, such as a polygon, a circle, an ellipse, or any closed curve.

Figure 16B:
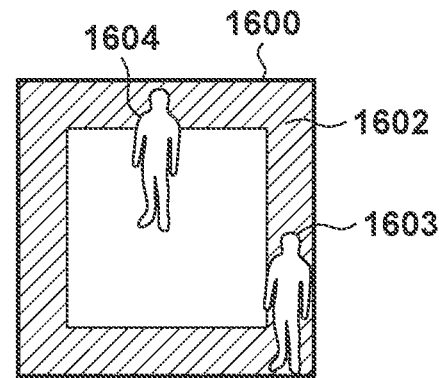

The size of the margin region can be set according to the size of a person to be a target of flow amount measurement. For example, the margin region can be set to a size that can include a portion necessary for detecting a person. FIG. 16B illustrates examples thereof. In FIG. 16B, the margin region 1602 of the extraction region 1600 is set to a size that can include a part required to detect a person 1603 or a person 1604 to be a target of flow amount measurement. More specifically, the size of the margin region is set so as be able to include the head and shoulders of a person. As other examples, the margin region may be set so that only the head of a person or the whole body of a person is included in the margin region.

Figure 16C:
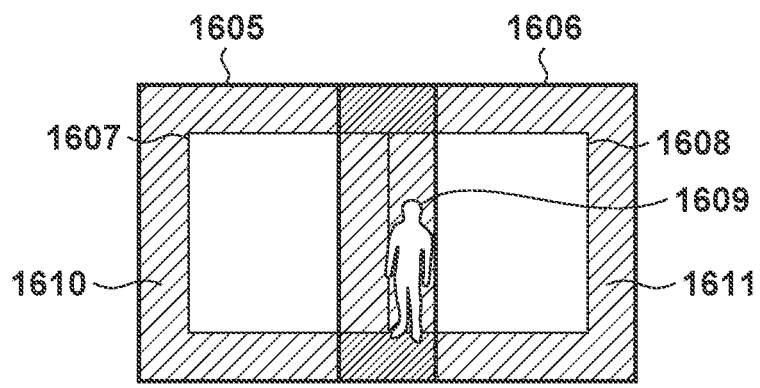

In the case of setting the margin region, the extraction regions for extracting the partial images can be set so that adjacent extraction regions overlap with each other. On the other hand, the extraction regions can be set so that the central region of a first extraction region included in the extraction regions and the central region of the second extraction region included in the extraction regions are adjacent to without overlapping each other. For example, in FIG. 16C, a central region 1607 of an extraction region 1605 and a central region 1608 of an extraction region 1606 are adjoined such that there is no gap between the central region 1607 and the central region 1608. On the other hand, a margin region 1610 of the extraction region 1605 overlaps with a margin region 1611 of the extraction region 1606. According to such a configuration, when a person 1609 to be a detection target is in the margin region 1610 of the extraction region 1605, the person 1609 can be detected from the central region 1608 of the extraction region 1606 adjacent to the extraction region 1605.

Figure 16D:
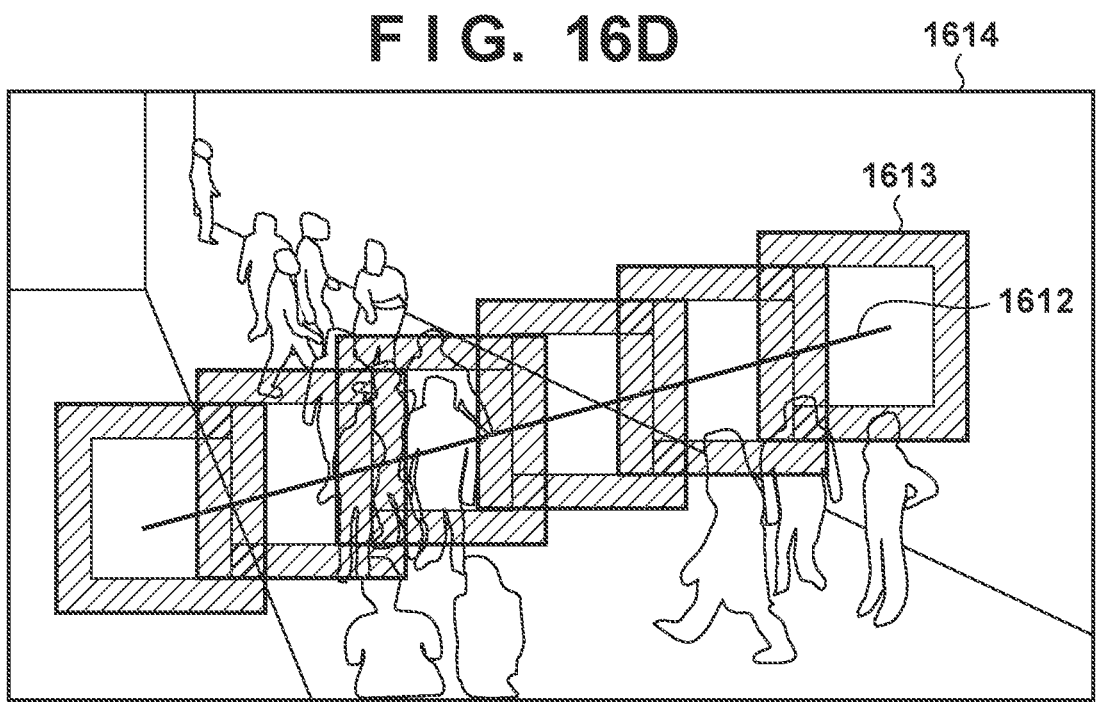

The extraction region setting methods described with reference to FIGS. 4A to 15B can also be used for extraction of partial images including such margin regions. For example, partial images can be extracted from each of the extraction regions and the peripheral regions thereof illustrated in FIGS. 4A to 15B. In this case, the images extracted from the extraction regions illustrated in FIGS. 4A to 15B correspond to the image in the central region 1601 of the extraction region 1600 of FIG. 16A. In addition, the images extracted from the peripheral regions of the extraction regions illustrated in FIGS. 4A to 15B correspond to the image in the margin region 1602 of the extraction region 1600 of FIG. 16A. FIG. 16D illustrates an example of an extraction region 1613 for extracting from an input image 1614 a partial image including a margin region provided along a detection line 1612.

The provision of a margin region is also effective for improving the accuracy in detection of a person passing the detection line near the edge of the central region. In one embodiment, the measurement unit 204 can detect a person passing the detection line and moving from the central region to the margin region between time t1 and time t2. For example, the measurement unit 204 can estimate the locus of a person between time t1 and time t2 using the partial images at times t1 and t2 extracted from the same extraction region. Further, when the locus intersects the detection line in the central region of the same partial image, it can be determined that the person has passed the detection line in this partial image. By providing such a margin region, when the measurement target such as a person moves at a high speed or when the frame rate of the video is low, it is possible to improve the accuracy in flow amount measurement in the vicinity of the edges of the central region.

In addition, according to such a method, the measurement unit 204 can measure the flow of the measurement target passing the detection line independently for each extraction region using a partial image extracted from the extraction region. For example, the measurement unit 204 can independently measure the flow of the measurement target passing the detection line in the central region of the first extraction region and the flow of the measurement target passing the detection line in the central region of the second extraction region. The, by aggregating the flow amount measurement result in each extraction region, the flow amount measurement result for the entire detection line can be acquired. Note that when the locus of a person intersects the detection line in the margin region of a partial image, there is no need to determine that the person has passed the detection line in this partial image. By such a method, it is possible to prevent measuring the same person in an overlapping manner in the adjacent partial images.

In the above description, extraction of partial images is performed so that each position of the detection line is included in one of the partial images. On the other hand, a margin region may be provided around the detection line, and the extraction regions may be set so that the collection of extraction regions includes the detection line and the margin region of the detection line. According to such a method, when a person (measurement target) moves at a high speed, when the frame rate of the video is low, or the like, the possibility of being able to detect each of the positions of people before and after passing the detection line is improved, and thereby, the accuracy of flow amount measurement can be improved.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While embodiments of the present disclosure have been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2020-204439, filed Dec. 9, 2020, which is hereby incorporated by reference herein in its entirety.

What is claimed is:

1. An image processing apparatus for measuring a flow of a measurement target based on a video, the image processing apparatus comprising:
one or more processors; and
one or more memories storing instructions that when executed by the one or more processors cause the one or more processors to perform:
setting a detection line within an image region of the video, the detection line indicating one or more positions at which the flow of the measurement target in the video is to be measured,
wherein the video includes a plurality of images, each of the images including the image region;
determining one or more partial image regions of the image region, the determined partial image regions located in a vicinity of the detection line;
extracting, from each of the plurality of images in the video, image data for the partial image regions set determined to be located in the vicinity of the detection line; and
measuring the flow of the measurement target passing the detection line by performing an image processing process on the extracted image data for the determined partial image regions but not for image data for the other regions of the image region.

2. The image processing apparatus according to claim 1, wherein the extracting comprises extracting image data for a number of partial image regions from one image among the plurality of images, wherein the number of partial image regions is based on a location and/or configuration of the detection line.

3. The image processing apparatus according to claim 1, wherein the extracting comprises:
setting one or more extraction regions in the image region of the video based on a location and/or configuration of the detection line; and
extracting, as the image data for a determined partial image region, image data included in each extraction region in one image among the plurality of images.

4. The image processing apparatus according to claim 3, wherein the extracting comprises:
setting a plurality of regions in the image region of the video such that a collection of the plurality of regions encompasses the detection line; and
setting, as the extraction region, a region intersecting the detection line among the plurality of regions.

5. The image processing apparatus according to claim 4, wherein
the extracting comprises setting a bounding box encompassing the detection line, and
the collection of the plurality of regions is a portion of the image region of the video and encompasses the bounding box.

6. The image processing apparatus according to claim 3, wherein the extracting comprises arranging a plurality of extraction regions along the detection line.

7. The image processing apparatus according to claim 6, wherein the extracting comprises setting the extraction region such that a representative point of the extraction region is positioned on the detection line, wherein the representative point of the extraction region is at a predetermined relative position with respect to the extraction region.

8. The image processing apparatus according to claim 6, wherein the extracting comprises setting the extraction region such that a representative point of the extraction region is positioned on a pixel representing a rasterized detection line, wherein the representative point of the extraction region is at a predetermined relative position with respect to the extraction region.

9. The image processing apparatus according to claim 6, wherein the extracting comprises setting the extraction region such that a representative point of the extraction region is positioned on an extended line of the detection line, wherein the representative point of the extraction region is at a predetermined relative position with respect to the extraction region.

10. The image processing apparatus according to claim 3, wherein the extracting comprises setting the extraction region such that a collection of one or more of the extraction regions encompasses the detection line.

11. The image processing apparatus according to claim 3, wherein the extracting comprises setting the extraction region such that a collection of a plurality of extraction regions encompasses the detection line other than a portion of the detection line set as a portion in which the measurement target will not be detected.

12. The image processing apparatus according to claim 3, wherein a size of the extraction region is set in accordance with a position in an image of the plurality of images in which the extraction region is set or a size of the measurement target in the extraction region in an image of the plurality of images.

13. The image processing apparatus according to claim 3, wherein a size of the extraction region is set such that, for each extraction region, a ratio of the size of the extraction region and a size of the measurement target in an image of the plurality of images is a predetermined ratio.

14. The image processing apparatus according to claim 3, wherein the extracting comprises generating a plurality of setting patterns each of which indicates a setting of the plurality of the extraction regions by repeating setting of a plurality of the extraction regions based on a position of the detection and then selecting one of the plurality of setting patterns.

15. The image processing apparatus according to claim 14, wherein the extracting comprises selecting one of the plurality of setting patterns in accordance with the number of the extraction regions set in each of the setting patterns.

16. The image processing apparatus according to claim 3, wherein the measuring comprises measuring the flow of the measurement target passing the detection line by performing the image processing process on the extracted image data for a partial image region extracted from the extraction region independently for each of two or more extraction regions.

17. The image processing apparatus according to claim 3, wherein
one extraction region includes a central region and a margin region around the central region,
a central region of a first extraction region of a plurality of extraction regions and a central region of a second extraction region of the plurality of extraction regions are adjacent to each other without overlapping each other, and
the measuring comprises independently measuring each of the flow of the measurement target passing the detection line in the central region of the first extraction region and the flow of the measurement target passing the detection line in the central region of the second extraction region.

18. The image processing apparatus according to claim 1, wherein the measuring comprises, in a case where a first partial image region and a second partial image region, included in the determined one or more determined partial image regions, have an overlapping portion, excluding the image data for the overlapping portion in the first partial image region or the second partial image region in performing the image processing for the measuring.

19. An image processing method of measuring a flow of a measurement target based on a video, the method comprising:
setting a detection line within an image region of the video, the detection line indicating one or more positions at which the flow of the measurement target in the video is to be measured,
wherein the video includes a plurality of images, each of the images including the image region;
determining one or more partial image regions of the image region, the determined partial image regions located in a vicinity of the detection line;
extracting, from each of the plurality of images in the video, image data for the partial image regions determined to be located in the vicinity of the detection line; and
measuring the flow of the measurement target passing the detection line by performing an image processing process on the extracted image data for the determined partial image regions but not for image data for the other regions of the image region.

20. A non-transitory computer-readable medium storing a program which causes a computer to perform:
setting a detection line within an image region of the video, the detection line indicating one or more positions at which the flow of the measurement target in the video is to be measured,
wherein the video includes a plurality of images, each of the images including the image region;
determining one or more partial image regions of the image region, the determined partial image regions located in a vicinity of the detection line;
extracting, from each of the plurality of images in the video, image data for the partial image regions set determined to be located in the vicinity of the detection line; and
measuring the flow of the measurement target passing the detection line by performing an image processing process on the extracted image data for the determined partial image regions but not for image data for the other regions of the image region.

* * * * *